United States Patent Office 3,098,882
Patented July 23, 1963

3,098,882
SELECTIVE HYDROGENATION PROCEDURE
AND CATALYST THEREFOR
Melvin R. Arnold, Louisville, Ky., assignor to Chemetron Corporation, Chicago, Ill., a corporation of Delaware
No Drawing. Filed Nov. 24, 1961, Ser. No. 154,840
4 Claims. (Cl. 260—677)

This invention relates generally to the hydrogenation of highly unsaturated hydrocarbons and especially to the selective hydrogenation of acetylenes and diolefins in gas mixtures containing high concentrations of olefins. More particularly, the invention involves an improved noble metal catalyst for such reactions and selective hydrogenation reactions using the catalyst.

This application is a continuation-in-part of my copending application, Serial No. 817,975, filed June 4, 1959, now abandoned.

Acetylenic hydrocarbons, as well as diolefinic hydrocarbons, because of their relative reactivity, may be hydrogenated more readily than hydrocarbons containing one double bond (olefins). Therefore, preferential hydrogenation (which is sometimes referred to as selective hydrogenation) of acetylenes and diolefins in a gas mixture containing olefins is possible in the presence of an active catalyst by limiting the amount of hydrogen added. Such selective hydrogenation poses a difficult problem, however, when only small amounts of acetylenic or diolefinc impurities are present in the gas mixture and when it is necessary to effect substantially complete hydrogenation of the acetylenes and diolefins without appreciably lowering the olefin content in order to produce gas suitable for use as a synthetic intermediate. By way of example, gas mixtures consisting essentially of ethylene for the production of polyethylene should not, in general, contain more than about 25 parts per million of such highly unsaturated impurities as acetylene, methylacetylene, propadiene and other diolefins of low molecular weight. For use in some of the newer polymerization processes it has been found that the concentration of acetylenes and diolefins in the purified olefin gases should preferably not exceed 10 parts per million.

It is known that a superior selective hydrogenation catalyst may be made by incorporating palladium on an alumina carrier in accordance with the disclosure of the Likins et al. Patent No. 2,946,829, July 26, 1960. Such catalyst is sufficiently active to completely hydrogenate highly unsaturated hydrocarbons at a commercially feasible rate and does not lose activity under process conditions of long periods of time. While this catalyst is an excellent catalyst for the purification of olefin streams under most operating conditions, it has been found under certain circumstances to be more active than may be desired. In all commercial selective hydrogenation processes an excess of hydrogen over that stoichiometrically required for the reduction of acetylenes and diolefins to olefins is required and with highly active catalysts the excess of hydrogen is consumed in reducing the olefins to saturated hydrocarbons, thereby reducing the olefin content of the stream with attendant disadvantages. Consumption of less hydrogen, in addition to providing a better yield of the desired olefin, would result in a smaller temperature rise with attendant improved control and selectivity. It is desirable to produce a selective hydrogenation catalyst having all of the advantages of the Likins et al. catalyst but having slightly less hydrogenation activity so that more selective hydrogenation of highly unsaturated hydrocarbons may be accomplished in olefin streams without substantially hydrogenation of the olefins.

An important object of this invention is to provide a catalyst and method which are capable of hydrogenating small amounts of acetylenic compounds in dry gaseous mixtures containing olefins or diolefins in such manner that the hydrogenation of the acetylenic compounds to olefins proceeds virtually to completion at a relatively low temperature and with a low stoichiometric excess of hydrogen to reduce the concentration of the acetylenic compounds to a few parts per million without substantially affecting the olefins or diolefins. A related object is to provide a catalyst and method for reducing diolefins to monoolefins without affecting the latter. Another object is to provide a hydrogenation catalyst which is relatively active in promoting the hydrogenation of acetylene hydrocarbons but relatively inactive in promoting the hydrogenation of olefins even in mixtures containing a major proportion of olefins. A further object is to provide a method of purifying olefin gas streams by removing acetylenes and/or diolefins by selective hydrogenation in the presence of a relatively inexpensive noble metal catalyst on an alumina carrier. These and other objects are apparent from and are achieved in accordance with the following disclosure.

I have discovered a palladium on alumina catalyst containing a small amount of chromium which is somewhat less active as hydrogenation catalyst for the saturation of olefins than ordinary palladium catalysts and is therefore more selective in the hydrogenation of acetylenes to olefins in the presence of olefins and diolefins and in the hydrogenation of diolefins to olefins in the presence of olefins, without any substantial hydrogenation of the olefins and diolefins to saturated hydrocarbons. When used as a selective hydrogenation catalyst in a gas stream containing a major proportion of olefin as the unsaturated hydrocarbon and a relatively minor proportion of acetylenes and diolefins with an excess of hydrogen over the theoretical amount required to reduce acetylenes and diolefins to olefins, the catalyst of this invention has an activity such that the excess of hydrogen is not consumed in reducing olefins to saturated hydrocarbons and the efficiency of the selective hydrogenation procedure is thereby enhanced.

The catalyst is prepared by spraying, dipping or otherwise applying to an alumina carrier a solution of a palladium compound and a chromium compound. The palladium compound and the chromium compound may be applied from the same solution or separate solutions of chromium compound and palladium compound may be used. The catalyst contains 0.01% to 0.5% palladium by weight and 0.01% to 0.5% chromium by weight. Catalysts with palladium contents greater than 0.5% by weight are operative (e.g., 1% Pd) but the increase in efficiency of the catalyst is usually not great enough to justify the increase in the cost of palladium, the latter being a precious metal in the platinum class. In most instances, it is preferred that the weight ratio of palladium to chromium be not substantially greater than unity. The maximum weight ratio of palladium to chromium is about 2:1 and the maximum weight ratio of chromium to palladium is about 1.5:1.

The combination of chromium and palladium on the alumina carrier tends to temper or lower the activity of the highly active palladium hydrogenation catalyst and at the same time to stabilize the catalyst against poisoning and inactivation. Consequently, the palladium-chromium combination on alumina is less easily inactivated under the conditions employed for the commercial hydrogenation of acetylenes in olefin streams. The catalyst is active as a selective hydrogenation catalyst in the temperature range from about 100° F. to about 400° F. and at pressures of about 50 to 500 p.s.i.g. The space velocity (volume of gas per volume of catalyst per hour at standard conditions of 60° F. and 1 atmosphere pressure) can vary from 50 to 2000. The amount of hydrogen may vary from 1.2 to 4 times the quantity required to hydrogenate the acetylenes to olefins or diolefins to olefins.

The following examples will further illustrate the nature and scope of the invention. It will be apparent that numerous modifications in conditions may be made within the ranges discussed herein without departing from the invention.

EXAMPLE 1

A palladium-chromium catalyst on alumina was prepared by mixing 22 liters of 0.05 molar palladium chloride solution and 22 liters of 0.1 molar chromic anhydride ($CrO_3$) solution and spraying the resulting mixture onto 400 kilos of 3/16 inch tablets of Filtrol grade 90 alumina which had been calcined for 8 hours at 950° F. The spraying operation was carried out while the alumina tablets were rotated in a revolving drum to insure uniform distribution of the ingredients on the surface of the carrier. The tablets were then calcined for 8 hours at 950° F. The catalyst so prepared contained 0.033% Pd and 0.036% Cr (ratio of palladium to chromium substantially unity).

The catalyst prepared as above was compared to a catalyst containing 0.046% Pd on the same alumina carrier prepared in accordance with the disclosure of Likins et al. Patent No. 2,946,829, by spraying 44 liters of 0.05 molar palladium chloride solution onto 400 kilos of 3/16 inch Filtrol grade 90 alumina tablets and calcining the sprayed tablets 8 hours at 950° F.

The two catalyst were tested in the same reactor under the same conditions. The reactor contained 25 cc. of catalyst and was operated at a temperature from 125° F. to 250° F. at a pressure of 350 p.s.i.g. and an hourly space velocity of 1000. The gas stream had a nominal composition as follows:

| | Percent |
|---|---|
| Propadiene | 1.0 |
| Methylacetylene | 1.0 |
| Propylene | 80.0 |
| Propane | 1.5 |
| Hydrogen | 2.5–7.0 |
| Methane | 14.0–9.5 |

The comparative results are given in the following table:

Table I

PART A.—0.046% Pd ON $Al_2O_3$

| Temp., ° F. | $H_2/C_3H_4$ mole ratio | $C_3H_4$ leakage, p.p.m. | $H_2$ leakage, p.p.m. |
|---|---|---|---|
| 150 | 3.5 | 30 | 0 |
| 125 | 3.5 | 80 | 2,000 |
| 200 | 3.5 | 100 | 0 |
| 250 | 3.5 | 250 | 0 |

PART B.—0.033% Pd AND 0.036% Cr ON $Al_2O_3$

| 150 | 3.5 | 50 | 8,000 |
| 200 | 3.5 | 40 | 150 |
| 250 | 3.5 | 10 | 65 |

The palladium-chromium-alumina catalyst showed better selectivity than the palladium-alumina catalyst throughout the temperature range of 150° F. to 250° F. as evidenced by the low $C_3H_4$ leakage and the reasonable $H_2$ leakage. The palladium-alumina catalyst appears to be too active in that it used up all of the hydrogen at 150° F. even at a hydrogen to $C_3H_4$ ratio of 3.5, without adequate removal of all the methylacetylene and propadiene.

EXAMPLE 2

In another operation, the catalysts described in Example 1 were compared at 150° F. to 250° F. on the same gas stream, but with lower molar hydrogen/$C_3H_4$ ratio. The results are given in Table II.

Table II

PART A.—0.046% Pd ON $Al_2O_3$

| Temp., ° F. | $H_2/C_3H_4$ mole ratio | $C_3H_4$ leakage, p.p.m. | $H_2$ leakage, p.p.m. |
|---|---|---|---|
| 150 | 2 | 174 | 0 |
| 200 | 2 | 514 | 0 |

PART B.—0.033% Pd AND 0.036% Cr ON $Al_2O_3$

| 150 | 2 | 18 | 844 |
| 200 | 2 | 11 | 61 |
| 250 | 2 | 81 | 0 |

It is seen that all the hydrogen was consumed, indicating hydrogenation of olefin, in part A. However, with the palladium-chromium-alumina catalyst in part B, there was substantial hydrogen leakage, indicating selectivity of the catalyst.

EXAMPLE 3

The palladium-chromium-alumina catalyst prepared in Example 1 was tested under various conditions, as shown in Table III, with high ratios of hydrogen to $C_3H_4$ and temperatures in the range of 150° F. to 300° F.

Table III 0.033% Pd AND 0.036% Cr ON $Al_2O_3$

| Temp., ° F. | $H_2/C_3H_4$ mole ratio | $C_3H_4$ leakage, p.p.m. | $H_2$ leakage, p.p.m. |
|---|---|---|---|
| 250 | 3.8 | 10 | 50 |
| 200 | 3.8 | 22 | 960 |
| 150 | 3.8 | 60 | 6,000 |
| 300 | 4. | 7 | 51 |

EXAMPLE 4

A palladium-chromium-alumina catalyst, prepared according to the method described in Example 1 and containing 0.026% Pd and 0.031% Cr, underwent a life test of two months without observable loss of activity or selectivity. The conditions were as described in Example 1 with the following exceptions:

| | |
|---|---|
| Space velocity, hourly | 800 |
| $H_2/C_3H_4$ mole ratio | 1.6 to 2.0 |
| Propadiene, inlet percent | 0.5 |
| Methylacetylene, inlet do | 1.5 |

After gaining full activity in two days at 160° F., the catalyst performed for 60 days at 130° F. with consistently less than 10 p.p.m. leakage of high unsaturates as shown in Table IV. The catalyst was removed at the end of the run and was found to be exceptionally free of carbonaceous deposit.

Table IV 0.026% Pd AND 0.031% Cr ON $Al_2O_3$

| Days on Stream | Temp., ° F. | $H_2/C_3H_4$ Mole Ratio | $C_3H_4$ leakage, p.p.m. | $H_2$ leakage, p.p.m. |
|---|---|---|---|---|
| 2 | 160 | 2.0 | 33 | 4,080 |
| 5 | 130 | 1.9 | 18 | 0 |
| 11 | 130 | 1.9 | 32 | 0 |
| 23 | 130 | 1.8 | 9 | 217 |
| 32 | 130 | 1.6 | 5 | 50 |
| 51 | 130 | 1.7 | 2 | 0 |
| 59 | 130 | 1.7 | 2 | 30 |

EXAMPLE 5

The effect of chromium as a modifier of the selective hydrogenation activity of palladium was demonstrated by a series of three runs on catalysts containing about 0.03% Pd and 0, 0.03 and 0.06% Cr, respectively. Use of 0.06% Cr produced an obvious inactivating influence on the catalyst. The catalyst containing no chromium performed fairly well at 140° F., but showed poor selectivity at 175° F. The use of approximately equal amounts of palladium and chromium produced a highly selective hydrogenation catalyst which was less sensitive to temperature changes than the chromium-free catalyst. This catalyst possesses obvious advantages in operation of a commercial selective hydrogenation reactor. Results of the evaluation of the effect of chromium are shown in Table V. The tests were conducted under the same conditions as described in Example 4.

Table V

PART A.—0.027% Pd ON Al₂O₃

| Temperature, ° F. | $H_2/C_3H_4$ Mole Ratio | $C_3H_4$ leakage, p.p.m. | $H_2$ leakage, p.p.m. |
|---|---|---|---|
| 140 | 2.0 | 2 | 113 |
| 175 | 2.0 | 70 | 26 |

PART B.—0.027% Pd AND 0.030% Cr ON Al₂O₃

| | | | |
|---|---|---|---|
| 140 | 2.0 | 2 | 44 |
| 175 | 2.0 | 39 | 34 |

PART C.—0.028% Pd AND 0.062% Cr ON Al₂O₃

| | | | |
|---|---|---|---|
| 140 | 2.0 | 10 | 408 |
| 175 | 2.0 | 497 | 38 |

EXAMPLE 6

This example illustrates the selective hydrogenation of vinylacetylene in the presence of 1,3-butadiene without hydrogenation of the latter. This is an extremely difficult reaction to conduct since both vinylacetylene and butadiene are very active compounds and both absorb hydrogen very readily to produce butene. This example therefore illustrates the selective nature of the catalyst of this application.

A palladium-chromium-alumina catalyst prepared according to the method described in Example 1 and containing 0.33% Pd and 0.24% Cr was found to be effective for the removal of $C_4$ acetylenes in the presence of a diolefin.

A feed material containing approximately 0.05% of vinylacetylene and 0.05% ethylacetylene in C.P. 1,3-butadiene was passed over 50 cc. of the catalyst. A total acetylene removal (approximately equal percentages of each) of 35–37% was accomplished without significant loss of butadiene.

0.33% Pd AND 0.24% Cr ON Al₂O₃

[Pressure, 15 p.s.i.g.; space velocity, 200; Mole ratio of hydrogen to acetylenes, 3.5:1]

| Temp., ° F. | Percent Acetylene Removal | $H_2$ Leakage | Maximum Butadiene Loss Computed, p.p.m. |
|---|---|---|---|
| 150 | 37 | 1,910 | 1,220 |
| 200 | 37 | 0 | 3,130 |

[Pressure, 50 p.s.i.g.; space velocity, 430; mole ratio of hydrogen to acetylenes, 3.5:1]

| | | | |
|---|---|---|---|
| 150 | 35 | 1,370 | 1,780 |

Although the acetylene removal was the same at 150 and 200° F., catalyst selectivity was higher at the lower temperature. Pressure did not appreciably affect the reaction.

This example was conducted as a differential test to study the activity and selectivity of the catalyst in selectively hydrogenating acetylenes in the presence of a large proportion of butadiene. The test was designed to compare butadiene loss at different conditions rather than to demonstrate acetylene removal. No effort was made to remove substantially all of the acetylenes, but the removal thereof would be greatly increased by the use of lower space velocities.

What is claimed as new and is desired to be secured by Letters Patent of the United States is:

1. A method of selectively hydrogenating acetylenic hydrocarbons in a gas wherein the major proportion of the unsaturated hydrocarbons is olefinic, which comprises contacting said gas, admixed with a quantity of hydrogen sufficient to reduce the acetylenic hydrocarbons to olefins, with a palladium and chromium on alumina catalyst which comprises from 0.01% to 0.5% by weight of palladium metal and from 0.01% to 0.5% by weight of chromium metal on an alumina carrier, at a temperature in the range of 100° F. to 400° F. at an hourly space velocity of 50 to 2000 volumes of gas per volume of catalyst.

2. A method of selectively hydrogenating the acetylenes in an olefin gas stream without reducing substantially the olefin content of said gas stream which comprises contacting said gas stream, admixed with a quantity of hydrogen in excess of that stoichiometrically equivalent to the quantity of acetylenes and diolefins in the gas stream, with a palladium-chromium catalyst supported on alumina which comprises from 0.01% to 0.5% by weight of palladium metal and from 0.01% to 0.5% by weight of chromium metal on an alumina carrier, at a temperature in the range of 100° F. to 400° F. at an hourly space velocity of 200 to 2000 volumes of gas per volume of catalyst.

3. A method of selectively hydrogenating methylacetylene and propadiene in a gas stream containing propylene as the major unsaturated constituent without substantially reducing the propylene content of said gas stream which comprises contacting said gas stream, admixed with at least 2 moles of hydrogen per mole of methylacetylene and propadiene, with a palladium-chromium catalyst supported on alumina which comprises from 0.01% to 0.5% by weight of palladium metal and from 0.01% to 0.5% by weight of chromium metal on an alumina carrier, at a temperature in the range of 100° F. to 400° F. at an hourly space velocity of 200 to 2000 volumes of gas per volume of catalyst.

4. A method of selectively hydrogenating $C_4$ acetylenes in a mixture containing a major proportion of 1,3-butadiene without reducing substantially the content of 1,3-butadiene in said mixture which comprises contacting said mixture, admixed with a quantity of hydrogen in excess of that stoichiometrically equivalent to the quantity of $C_4$ acetylenes in the mixture, with a palladium-chromium catalyst which comprises from 0.01% to 0.5% by weight of palladium metal and from 0.01% to 0.5% by weight of chromium metal on an alumina carrier, at a temperature in the range of 100–200° F. at an hourly space velocity of 50–500 volumes of gas per volume of catalyst.

References Cited in the file of this patent

UNITED STATES PATENTS

| | | |
|---|---|---|
| 1,836,927 | Linckh et al. | Dec. 15, 1931 |
| 2,317,683 | Greensfelder | Apr. 27, 1943 |
| 2,946,829 | Likins et al. | July 26, 1960 |